United States Patent [19]

Inoue et al.

[11] 4,204,422
[45] May 27, 1980

[54] PRESSURE MEASURING DEVICE

[75] Inventors: Yuichiro Inoue, Mitaka; Masamichi Sakaki, Yokohama, both of Japan

[73] Assignee: Tokyo Shibaura Denki Kabushiki Kaisha, Kawasaki, Japan

[21] Appl. No.: 37,954

[22] Filed: May 10, 1979

[30] Foreign Application Priority Data

May 19, 1978 [JP] Japan .................................. 53-58867

[51] Int. Cl.² ............................................. G01L 27/00
[52] U.S. Cl. ......................................... 73/4 R; 73/576
[58] Field of Search .................................. 73/4 R, 756

[56] References Cited

U.S. PATENT DOCUMENTS

| 476,512 | 6/1892 | Bosworth | 73/4 R |
| 4,051,712 | 10/1977 | Zias | 73/4 R |

*Primary Examiner*—S. Clement Swisher
*Attorney, Agent, or Firm*—Cushman, Darby & Cushman

[57] ABSTRACT

A pressure measuring device comprises a main solenoid valve of which a first opening is connected to a pipe through which a fluid to be measured flows and of which a second opening is connected to a pressure transducer. A third opening of the main solenoid valve is connected to an auxiliary solenoid valve which causes the third opening to be exposed to the atmosphere during an inspection and which applies the same pressure as that of the fluid to the third opening during a measurement.

5 Claims, 3 Drawing Figures performance measuring device

PRESSURE MEASURING DEVICE

BACKGROUND OF THE INVENTION

This invention relates to a pressure measuring device for process control, capable of easy and speedy correction and with improved measurement accuracy.

In order to use a pressure measuring device always with high accuracy, it is essential to conduct periodical inspection for correction. However, it is a troublesome, time-consuming task to make such inspection manually for each of many pressure measuring devices. In such inspection, it is necessary to apply the atmospheric pressure as a reference pressure to the device and to adjust the device in accordance with the reference pressure. For this purpose, there is known such a device as shown in FIG. 1, for example. In this device, a pipe 1 to carry a measuring object or fluid to be measured is provided with a branch pipe 1a, which is connected with a pressure transducer 3 through a solenoid valve 2. The solenoid valve 2 has a valve opening 2a connected to the pipe 1 side of the branch pipe 1a, an opening 2b connected to the transducer 3 side of the branch pipe 1a, and an opening 2c which opens into the atmosphere. Therefore, the atmosphere may be introduced into the device through the valve opening 2c by operating the valve. In measurement the valve openings 2a and 2b are caused to communicate with each other, while in inspection the communicating direction of the solenoid valve 2 is changed to connect the valve openings 2b and 2c, thereby allowing the atmospheric pressure to be measured by means of the transducer 3.

According to the aforementioned prior art device, if the inspection is repeated quite frequently or the pressure inside the pipe is pretty high, a leakage may be caused in the solenoid valve, leading to an error in the measurement of the fluid pressure. Namely, with the valve openings 2a and 2b connected and the openings 2b and 2c disconnected from each other during the pressure measurement, the fluid will leak out from the pipe through the valve opening 2c to induce a pressure loss between the junction of the pipe 1 and the branch pipe 1a and the valve opening 2b of the solenoid valve 2. In consequence, the fluid pressure inside the pipe 1 will be prevented from being transmitted entire to the pressure transducer 3, thus causing the pressure transducer to produce a wrong measurement result.

SUMMARY OF THE INVENTION

An object of this invention is to provide a pressure measuring device capable of correcting a pressure signal in measurement by means of a correction signal based on a comparison with a reference pressure in inspection, and measuring the pressure inside a pipe independently of the frequency of inspection and the level of the pressure inside the pipe.

Another object of this invention is to provide a pressure measuring device capable of higher-accuracy measurement with reduced pressure losses between the pipe through which a measuring object or fluid to be measured flows and a pressure transducer.

DETAILED DESCRIPTION OF THE PREFERRED EMBODIMENTS

Now there will be described embodiments of the pressure measuring device of this invention with reference to the accompanying drawing.

Figure 2:
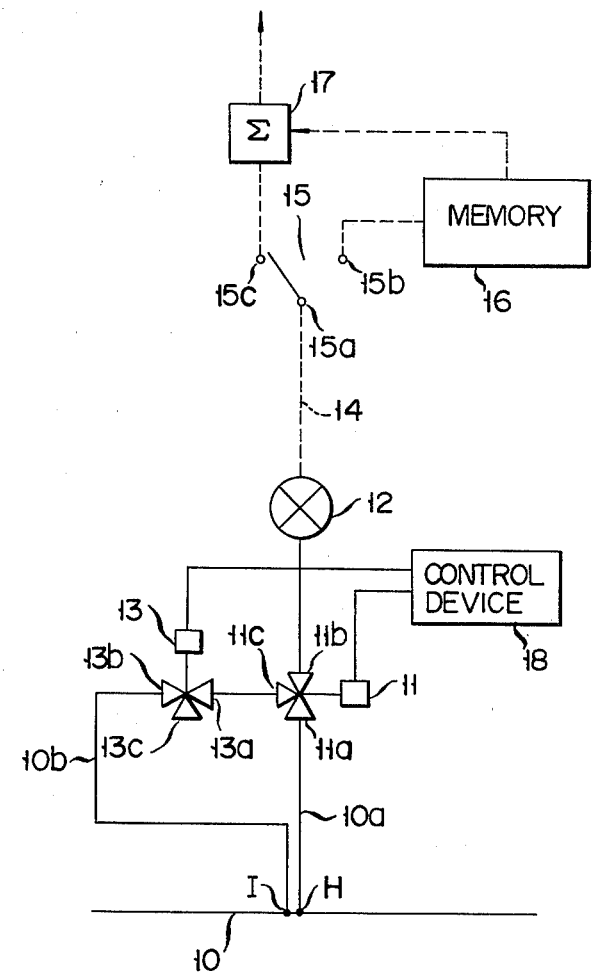
FIG. 2 is a system diagram showing a pressure measuring device according to an embodiment of this invention.

In the device of FIG. 2, a first valve opening 11a of a main solenoid valve 11 is connected to a first branch pipe 10a branching off at a point of measurement H of a pipe 10 through which a fluid to be measured flows. A second valve opening 11b of the solenoid valve 11 is connected with a pressure transducer 12, which senses the pressure of the fluid transmitted thereto through the first and second valve openings 11a and 11b, and converts the pressure into an electrical signal. A third valve opening 11c of the main solenoid valve 11 is connected with a first valve opening 13a of an auxiliary solenoid valve 13. A third valve opening 13b of the auxiliary solenoid valve 13 is connected to another branch pipe 10b branching off at a diverging point I near the point H of the pipe 10. Further, a second valve opening 13c of the valve 13 opens into the atmosphere.

A movable contact 15a of a changeover switch 15 is connected to the output side of the pressure transducer 12 by means of an output signal line 14. A first fixed contact 15b of the changeover switch 15 is connected with a memory unit 16 to store a reference calibration value, while a second fixed contact 15c is connected with a computing element 17. The memory unit 16, which is formed of, for example, a comparison amplifier and a hold amplifier, stores a difference between an output signal value delivered from the pressure transducer 12 when the pressure transducer 12 is caused to communicate with the atmosphere and a theoretical output signal value, that is, a correction signal or reference calibration value. If the stored value is required to be held for a prolonged time, the reference calibration value need only be AD-converted and stored in an IC memory or the like. The computing element 17, which is connected to the output side of the memory unit 16, adds the reference calibration value from the memory unit 16 to the measured value from the pressure transducer 12 in a pressure measurement, and delivers a corrected pressure signal. Numeral 18 designates a conventional control device which produces solenoid valve driving signals for selective operations of the main and auxiliary solenoid valves 11 and 13. For example, the valve 11 has its valve opening 11a connected with the valve opening 11b in response to the signal from the control device.

Now there will be described the function and operation of the pressure measuring device of the aforementioned construction.

In inspection of the output signal from the pressure transducer, the main and auxiliary solenoid valves 11 and 13 are energized by the solenoid valve driving signals from the control device 18, thereby causing the second and third valve openings 11b and 11c of the main solenoid valve 11 and the first and second valve openings 13a and 13c of the auxiliary solenoid valve 13 to communicate with one another. Consequently, the pressure transducer 12 perceives the atmospheric pressure through the solenoid valves 11 and 13, and delivers an output signal equivalent to the atmospheric pressure as a reference pressure. This output signal is supplied to the memory unit through the first movable contact 15b of the changeover switch 15, and compared with the theoretical output signal value to provide the difference between the two values, which is stored as a correction signal or reference calibration value. Thus, the correction is accomplished. Then, both the solenoid valves 11 and 13 are de-energized by the measurement signal from the control device 18, the first and second valve openings 11a and 11b of the main solenoid valve 11 are caused to communicate with each other, and the fluid pressure inside the pipe 10 is sensed by the pressure transducer 12 through the first branch pipe 10a and the main solenoid valve 11. At this time, the first and third valve openings 13a and 13b of the auxiliary solenoid valve 13 are connected with each other, so that the pressure inside the pipe 10 is transmitted also to the third valve opening 11c of the main solenoid valve 11 through the second branch pipe 10b and the auxiliary solenoid valve 13. Accordingly, the pressure differences between the first and third valve openings 11a and 11c of the main solenoid valve 11 and between the second and third valve openings 11b and 11c are eliminated, causing no pressure leak among these valve openings. Thus, even though pretty high, the pressure inside the pipe 10 may be transmitted entire to the pressure transducer 12 without involving any pressure loss. An electric output signal corresponding to the pressure signal from the transducer 12 is applied to the computing element 17 via the second fixed contact 15c of the changeover switch 15. In the computing element 17, the correction signal or reference calibration value from the memory unit 16 is added to the output signal, and a corrected signal for a correct measured pressure is provided.

According to thus constructed device, high-accuracy pressure measurement can always be achieved by automatically adding to the measured value the reference calibration value previously stored with every calibration for the reference pressure (atmospheric pressure) from the pressure transducer 12, conjointly due to the aforesaid pressure loss preventive effect.

Figure 3:
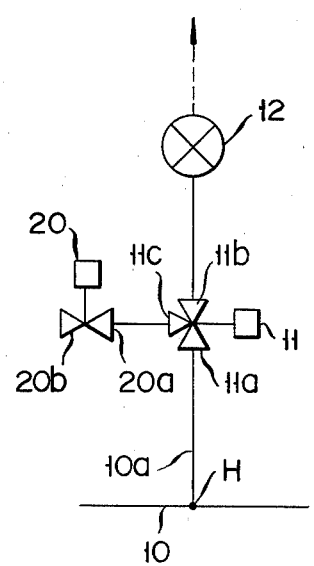
FIG. 3 is a system diagram showing a pressure measuring device according to another embodiment of the invention.

Referring now to FIG. 3, there will be described another embodiment of the pressure measuring device of the invention.

Figure 1:
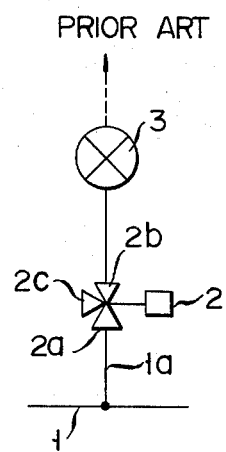
FIG. 1 is a system diagram showing a prior art pressure measuring device.

In this Figure, the system for processing the output signal of the pressure transducer is omitted because of its sameness with the one in the aforesaid embodiment, and like reference numerals refer to the same parts as shown in FIG. 1, detailed description thereof being omitted.

In the device of this embodiment, two valve openings 20a and 20b are provided for an auxiliary solenoid valve 20, and the second branch pipe is disused. The first valve opening 20a of the auxiliary solenoid valve 20 is connected to the third valve opening 11c of the main solenoid valve 11, while the second valve opening 20b opens into the atmosphere.

In inspection, both the solenoid valves 11 and 20 are excited by means of the solenoid valve driving signals from the control device to cause the first and second valve openings 20a and 20b of the auxiliary solenoid valve 20, as well as the second and third valve openings 11b and 11c of the main solenoid valve 11, to communicate with each other. Thus, the atmospheric pressure is perceived by the pressure transducer 12 through the solenoid valves 11 and 20.

In measurement, on the other hand, both the solenoid valves 11 and 20 are de-energized, the first and second valve openings 11a and 11b of the main solenoid valve 11 are connected with each other, and the first and second valve openings 20a and 20b of the auxiliary solenoid valve 20 are disconnected from each other. Accordingly, if there is any leak from the third valve opening 11c of the solenoid valve 11, pressure loss may be prevented since the valve openings 20a and 20b of the auxiliary solenoid valve 20 are disconnected from each other to make the pressure between the valve openings 11c and 20a equal to the pressure inside the pipe 10.

Although in the aforementioned two embodiments the atmospheric pressure is used for the reference pressure, any suitable reference pressure source may alternatively be employed. That is, a reference pressure source is to be connected to the second valve opening 13c of the auxiliary solenoid valve 13 for the embodiment of FIG. 2 or to the second valve opening 20b of the auxiliary solenoid valve 20 for the embodiment of FIG. 3.

Moreover, in the embodiment of FIG. 2, the pipe 10 side end of the branch pipe 10b may alternatively be connected to the branch pipe 10a.

What we claim is:

1. In a pressure measuring device comprising a main solenoid valve having a first valve opening connected to a branch pipe diverging from a pipe through which a fluid to be measured flows and further having second and third valve openings, and a pressure transducer connected to the second valve opening of said main solenoid valve, whereby the pressure of the fluid inside said pipe is measured, the improvement which comprises an auxiliary solenoid valve having a first valve opening connected to the third valve opening of said main solenoid valve and a second valve opening to which a reference pressure is applied, a control circuit to produce a solenoid valve driving signal for connecting in inspection the second and third valve openings of said main solenoid valve and the first and second valve openings of said auxiliary solenoid valve, and connecting in measurement the first and second valve openings of said main solenoid valve and disconnecting the first and second valve openings of said auxiliary solenoid valve, and a means for correcting an output signal from said pressure transducer corresponding to the measured fluid pressure in accordance with an output signal from said pressure transducer corresponding to the reference pressure at inspection.

2. A pressure measuring device according to claim 1, wherein the second valve opening of said auxiliary solenoid valve opens into the atmosphere.

3. A pressure measuring device according to claim 1 or 2, wherein said auxiliary solenoid valve has a third valve opening connected in measurement to a portion of said pipe near the junction of said pipe and said branch pipe or to said branch pipe.

4. A pressure measuring device according to claim 1, wherein said correcting means includes a memory unit for comparing an output signal delivered from said pressure transducer in inspection with a predetermined theoretical output signal corresponding to said reference pressure and storing as a correction signal the difference between said two output signals, and a computing element for adding the correction signal from said memory unit to an output signal delivered from said pressure transducer in measurement.

5. A pressure measuring device according to claim 4, wherein said auxiliary solenoid valve has a third valve opening connected in measurement to a portion of said pipe near the junction of said pipe and said branch pipe or to said branch pipe.

* * * * *